(12) United States Patent
Ter Beest, III et al.

(10) Patent No.: US 11,113,530 B2
(45) Date of Patent: Sep. 7, 2021

(54) SYSTEM AND METHOD FOR DYNAMIC THREE DIMENSIONAL COMMAND AND CONTROL

(71) Applicant: Booz Allen Hamilton Inc., McLean, VA (US)

(72) Inventors: James J. Ter Beest, III, McLean, VA (US); Evan Montgomery-Recht, McLean, VA (US); Mary Palmer, Arlington, VA (US); Alexander Tejada, Arlington, VA (US); Sanjana Thirumalai, Washington, DC (US); Jeremiah White, Frederick, MD (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 0 days.

(21) Appl. No.: 16/733,835

(22) Filed: Jan. 3, 2020

(65) Prior Publication Data

US 2021/0209366 A1  Jul. 8, 2021

(51) Int. Cl.
*G06K 9/00* (2006.01)
*G06K 9/32* (2006.01)
(Continued)

(52) U.S. Cl.
CPC ....... *G06K 9/00671* (2013.01); *G06K 9/0063* (2013.01); *G06K 9/00771* (2013.01);
(Continued)

(58) Field of Classification Search
CPC .......... G06K 9/00671; G06K 9/00771; G06K 9/0063; G06K 9/3233; G06T 17/00; H04L 63/1458; F41H 13/0043
See application file for complete search history.

(56) References Cited

U.S. PATENT DOCUMENTS

2008/0079723 A1* 4/2008 Hanson ................ G06K 9/0063
 345/427
2010/0177120 A1* 7/2010 Balfour .................. G06T 19/20
 345/647
(Continued)

FOREIGN PATENT DOCUMENTS

EP  2 169 355 A1  3/2010

OTHER PUBLICATIONS

Jaenen et al., "Distributed Three-Dimensional Camera Alignment in Highly-Dynamical Prioritized Observation Areas," Distributed Smart Cameras (ICDSC), 2011 Fifth ACM/IEEE International Conference on, IEEE, (Aug. 22, 2011), pp. 1-6, XP031974706.
(Continued)

*Primary Examiner* — William A Beutel
(74) *Attorney, Agent, or Firm* — Buchanan Ingersoll & Rooney PC

(57) ABSTRACT

An exemplary system for monitoring an operational area, includes a processor that receive plural data streams. Each data stream can include a different spatial characteristic of the operational area. The processor also generates a three-dimensional (3D) virtual visualization of the operational area based on observational perspectives associated with the data streams and their associated spatial characteristics and dynamically prioritizes operational sub-regions within the operational area based on the spatial characteristics. The processor generates a signal encoded with data for verifying the 3D virtual visualization of the operational area including the prioritized operational sub-regions.

43 Claims, 6 Drawing Sheets

(51) Int. Cl.
*G06T 17/00* (2006.01)
*H04L 29/06* (2006.01)
*F41H 13/00* (2006.01)

(52) U.S. Cl.
CPC ............ *G06K 9/3233* (2013.01); *G06T 17/00* (2013.01); *H04L 63/1458* (2013.01); *F41H 13/0043* (2013.01)

(56) References Cited

U.S. PATENT DOCUMENTS

| | | |
|---|---|---|
| 2010/0201787 A1 | 8/2010 | Zehavi |
| 2010/0283782 A1* | 11/2010 | He .......................... G06T 17/05 345/420 |
| 2015/0268058 A1 | 9/2015 | Samarasekera et al. |
| 2018/0232947 A1 | 8/2018 | Nehmadi et al. |
| 2019/0226898 A1 | 7/2019 | Gray, Jr. |
| 2020/0133298 A1* | 4/2020 | Fowler ..................... G01V 3/12 |

OTHER PUBLICATIONS

Notification of Transmittal of the International Search Report (Forms PCT/ISA/220 and PCT/ISA/210) and the Written Opinion of the International Searching Authority (Form PCT/ISA/237) dated Apr. 7, 2021, by the European Patent Office in corresponding International Application No. PCT/US2020/067607. (15 pages).

* cited by examiner

FIG. 1
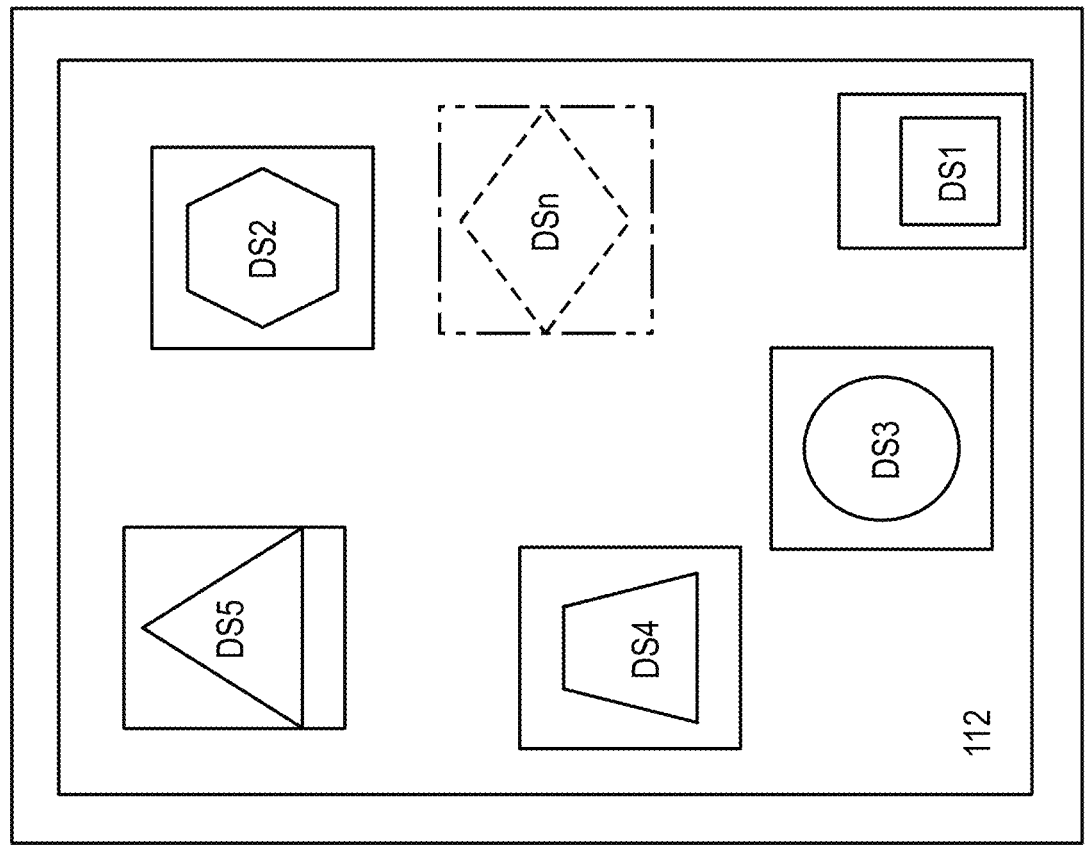
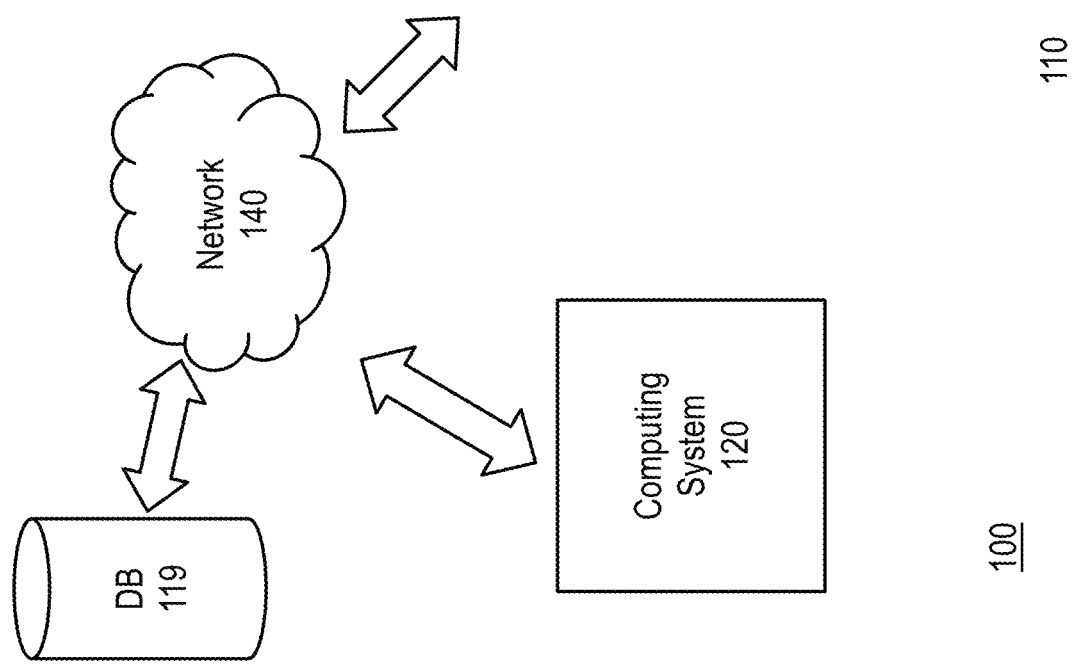

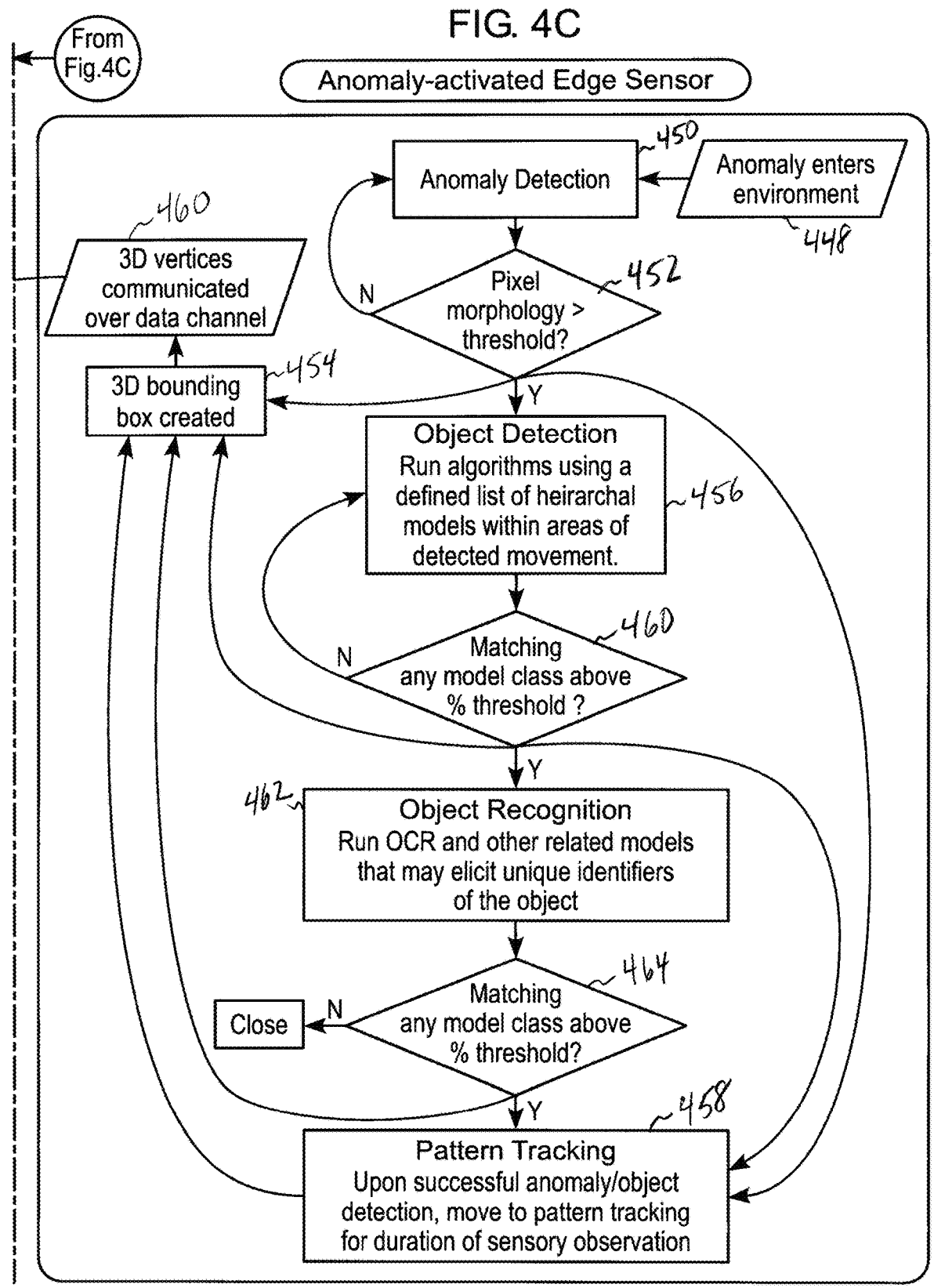

SYSTEM AND METHOD FOR DYNAMIC THREE DIMENSIONAL COMMAND AND CONTROL

FIELD

The present disclosure relates to systems and methods for monitoring an operational area.

BACKGROUND

It is often desirable to maintain situational awareness of a force protection area to mitigate hostile actions against military personnel, the general public, resources, facilities and critical information, such as a military base, airport, stadium, transit system, smart city, power plant or detention facility, and autonomously react to newly sensed information in these locations. In today's command and control environment, rapid reaction to newly acquired information is necessary so an operator can decide on actions to quickly changing circumstances.

An operator can quickly make decisions by having the system recommend predefined rules of engagement based on the newly sensed situational awareness information. Further, an autonomous system may be able to support decision-making actions independent of an operator if the automated responses are properly controlled and potential consequences of improper responses are carefully considered and the associated potential risks are deemed to be warranted.

Sensor fusion systems demonstrate the efficacy of combining diverse perspectives in an operational area to improve decision making processes. Such systems may provide insight to facilitate object detection, identification, classification, geospatial positioning, geospatial navigation, and many other contextual data metrics that can be derived from data of heterogeneous sensors. With a potential data volume greater than what can be analyzed by unaided human intellect, computer-based support can be necessary, or at a minimum facilitate, the processing and analysis of new data. Further, desired insights may require additional data or analytic processing—such as making sensor adjustments, performing rapid analytics of the data, or real-time reaction to immediate threats that are identified as a result of data analysis.

SUMMARY

An exemplary system for monitoring an operational area is disclosed, the system comprising: a processor configured to: receive plural data streams, each data stream including a different spatial characteristic of the operational area; generate a three-dimensional (3D) virtual visualization of the operational area based on observational perspectives associated with the data streams and their associated spatial characteristics; dynamically prioritize operational sub-regions within the operational area based on the spatial characteristics; and generate a signal encoded with data for verifying the 3D virtual visualization of the operational area including the prioritized operational sub-regions.

An exemplary method for monitoring an operational area is disclosed, the method comprising: in one or more devices connected in a network: receiving one or more data streams, each data stream including a different spatial characteristic of the operational area; generating a 3D virtual visualization of the operational area based on an observational perspective associated with each data stream and the different spatial characteristics included in each data stream; dynamically prioritizing operational sub-regions within the operational area based on the received spatial characteristics; and generating a signal for verifying the 3D visual virtualization of the operational area including the prioritized operational sub-regions.

An exemplary computer readable medium encoded with a program for performing a method of monitoring an operational area, which when placed in communicative contact with a processor is disclosed, the program configuring the processor to: generate a three-dimensional (3D) virtual visualization of the operational area based on an observational perspective of plural data streams and different spatial characteristics included in each data stream; dynamically prioritize operational sub-regions within the operational area based on the spatial characteristics; and generate a signal for verifying the 3D virtual visualization of the operational area including the prioritized operational sub-regions.

BRIEF DESCRIPTION OF THE DRAWINGS

Exemplary embodiments are best understood from the following detailed description when read in conjunction with the accompanying drawings. Included in the drawings are the following figures:

FIG. 1 illustrates a system for dynamic three-dimensional command and control in accordance with an exemplary embodiment of the present disclosure.

FIGS. 4A-4C illustrate a flow diagram of a method performed by the system of FIG. 1 in accordance with an exemplary embodiment of the present disclosure.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

Exemplary embodiments of the present disclosure can provide real-time three-dimensional (3D) situational awareness of morphological objects in an operational area and support command, control, communications, collection of intelligence, analysis of data regarding the operational area, surveillance, and reconnaissance (C4ISR). In addition, the disclosed exemplary embodiments can instantiate efficient means for processing heterogeneous sensor data and control dynamic sensor data collection without human intervention. The system and methods described herein extend beyond common sensor fusion methods by interrogating objects after initial sensor data ingestion occurs. For example, the disclosed system and methods can be implemented in the control of servo motors (e.g., optical pan/tilt/zoom), steering electromagnetic antennas (e.g., phased array antennas, servo motor-controlled directional antennas, operating plasma antennas, or importing interferometry of laser analysis of cesium atoms), software defined radios (e.g., controlled adjustment of spectral monitoring), and relocation of unmanned vehicles equipped with sensors to other positions within and outside of the operational area.

Additionally, the exemplary embodiments disclosed herein may provide capabilities for autonomously targeting, exploiting and defeating real-time threats to an operational area if those threats and respective rules of engagement have been confirmed. Exploiting or defeating targets may include soft kill weapons such as electronic warfare tools or hard kill weapons such as directed energy equipment and traditional kinetic systems.

Figure 2:
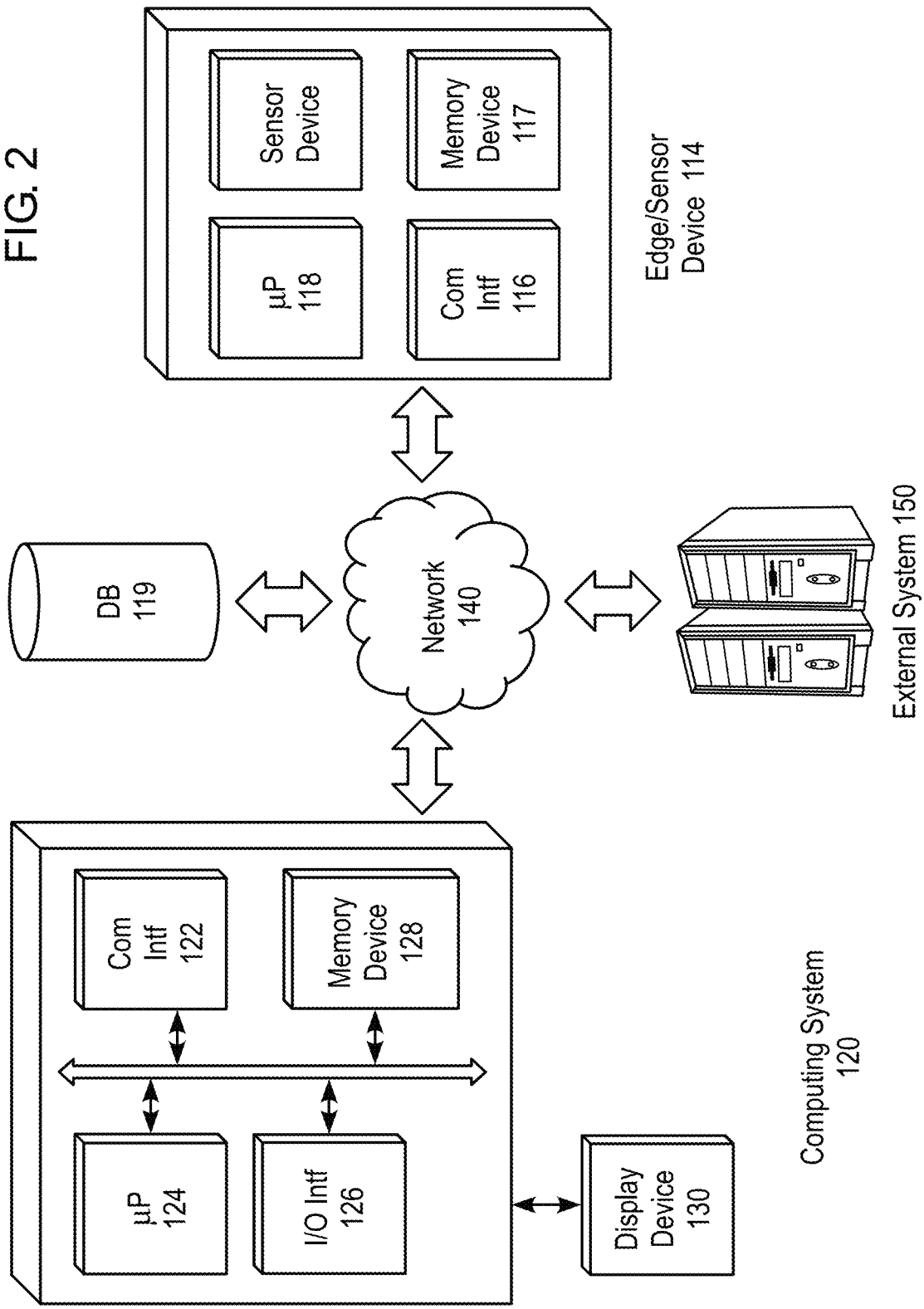
FIG. 2 illustrates an exemplary computing device and edge detection devices in accordance with an exemplary embodiment of the present disclosure.

The exemplary embodiments of the present disclosure provide several advantages including: Emergency Response for situational awareness in locating and tracking resources, threats, and military personnel or civilians in need of assistance; automated robotics surrounding awareness including use cases such as warehouse operations and self-driving vehicles; and in assistance with off the grid navigation services in the event satellite, triangulation, or other means of identifying spatial coordinates are unavailable FIG. 1 illustrates a system for dynamic three-dimensional command and control in accordance with an exemplary embodiment of the present disclosure. FIG. 2 illustrates an exemplary computing device and edge detection devices in accordance with an exemplary embodiment of the present disclosure.

As shown in FIGS. 1 and 2, an exemplary system 100 for monitoring an operational area 110 is disclosed. The system 100 includes a computing system 120 having a communication interface 122, a processor 124, an input/output (I/O) interface 126, a memory device 128, and a display device 130. The components of the computing system 120 can include a combination of hardware and software devices. The computing system 120 can be configured to: receive plural data streams via the communication interface 122, each data stream including a different spatial characteristic of the operational area 110. The processor 124 can be configured to generate a three-dimensional (3D) virtual visualization of the operational area for display on the display device 130 based on observation perspectives associated with the data streams and the spatial characteristics. The processor 124 can also be configured to dynamically prioritize operational sub-regions within the operational area 110 based on the spatial characteristics and generate a signal encoded with data for verifying the three-dimensional virtual visualization of the operational area 110 including the prioritized operational sub-regions.

The communication interface 122 can include a receiving and transmitting device configured to connect to a network 140. The communication interface 122 can be encoded with program code to receive and transmit data signals and/or data packets over the network 140 according to a specified communication protocol and data format. During a receive operation, the communication interface 122 can identify parts of the received data via the header and parse the data signal and/or data packet into small frames (e.g., bytes, words) or segments for further processing at the processor 124. During a transmit operation, the communication interface 122 can receive data from the processor 124 and assemble the data into a data signal and/or data packets according to the specified communication protocol and data format of the network 140. The communication interface 122 can include one or more receiving devices and transmitting devices for providing data communication according to any of a number of communication protocols and data formats as desired. For example, the communication interface 122 can be configured to communicate over the network 140, which may include a local area network (LAN), a wide area network (WAN), a wireless network (e.g., Wi-Fi), a mobile communication network, a satellite network, the Internet, optic fiber, coaxial cable, infrared, radio frequency (RF), or any combination thereof. Other suitable network types and configurations will be apparent to persons having skill in the relevant art. The communication interface 122 can include any suitable hardware components such as an antenna, a network interface (e.g., an Ethernet card), a communications port, a PCMCIA slot and card, or any suitable processing devices for performing functions according to the exemplary embodiments described herein.

The processor 124 can be a special purpose or a general purpose hardware processing device encoded with program code or software for performing the exemplary embodiments disclosed herein. The processor 124 can be connected to a communications infrastructure including a bus, message queue, network, multi-core message-passing scheme, etc. The processor 124 can include one or more processing devices such as a microprocessor, central processing unit, microcomputer, programmable logic unit or any other suitable hardware processing device as desired.

The I/O interface 126 can be configured to receive the signal from the processor and generate an output verifying the 3D virtual visualization of the operational area. The I/O interface 126 can include a combination of hardware and software for example, a processor, a circuit card, or any other suitable hardware device encoded with program code, software, and/or firmware for communicating with a peripheral device such as the display device 130.

The memory device 128 can be configured to store the plural data streams. The memory device 128 can include one or more memory devices such as volatile or non-volatile memory. For example, the volatile memory can include random access memory, read-only memory, etc. The non-volatile memory can include a resident memory device such a hard disk drive and a removable storage drive (e.g., a floppy disk drive, a magnetic tape drive, an optical disk drive, a flash memory, or any other suitable device). The non-volatile memory can also or in the alternative include an external memory device connected to the computing device 102 via the I/O interface 126. Data stored in the computer system 120 (e.g., in a non-volatile memory) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The display device 130 can include high-definition multimedia interface (HDMI), digital visual interface (DVI), video graphics array (VGA), or any suitable display device or display type as desired. The display 130 may be any suitable type of display for displaying data transmitted via the I/O interface 126 of the computer system 120, including a cathode ray tube (CRT) display, liquid crystal display (LCD), light-emitting diode (LED) display, capacitive touch display, thin-film transistor (TFT) display, etc.

The operational area 110 can include a sensor arrangement 112 configured to generate the plural data streams by observing the operational area. The sensor arrangement 112 can include a plurality of heterogeneous sensors DS1-DSn of various types such as sensors any one or more of an acoustic, radio frequency, electro-optical, thermal, chemical, biological, radiological, nuclear, explosive, temperature, mechanical, etc. Each sensor DS1-DSn can be attached, affixed, or integrated into an edge device 114 to establish a dynamic sensor (DS) or edge device that can be moved between two or more locations within the operational area 110. The sensor data is dynamically acquired, meaning one or more of the dynamic sensors D1-DSn may appear or disappear on the network 140 at any given time. The sensor data is then stored in a memory device 117 or real-time memory-based database 119, such as Redis or any suitable database as desired, for later processing and analysis operations. The edge device 114 with an attached or integrated dynamic sensor DSn can include a communication interface 116 configured to receive the plural data streams of other sensors. The edge device 114 can include one or more processors 118 configured to generate a 3D virtual visualization of the operational area 110, dynamically prioritize operational sub-regions within the operational area 110, and generate a signal encoded with data for verifying the 3D virtual visualization of the operational area 110. Each dynamic sensor DSn is configured to transmit a data stream periodically or non-periodically to the computing device 120 over the network 140. For example, one or more dynamic sensors DS1-DSn can be configured to transmit data to the computing device 120 when a change in a spatial characteristic of an operational sub-region is detected. Each data stream has data of a sensor type and is generated by the corresponding sensor observing the operational area, and a 3D geometry of each operational sub-region is created using one or more characteristics of the sensor arrangement. For example, if the dynamic sensor DSn of an edge device 114 is an image sensor or camera, the 3D geometry of the operational sub-region 310 can be determined by a field of view (e.g., a cone or triangle) of the image. According to another exemplary embodiment, the dynamic sensor DSn can be an acoustic sensor wherein the sensing field can be represented by a circular shape. According to another exemplary embodiment, the 3D geometry of each operational sub-region 310 can be dimensioned according to spatial properties of the operational area 110. For example, one or more operational sub-regions 115 can include a 3D geometry having sides and/or a shape limited or constrained by the bordering features (e.g., bodies of water) or physical features (e.g., mountainous or rocky terrain) of the operational area.

Figure 3:
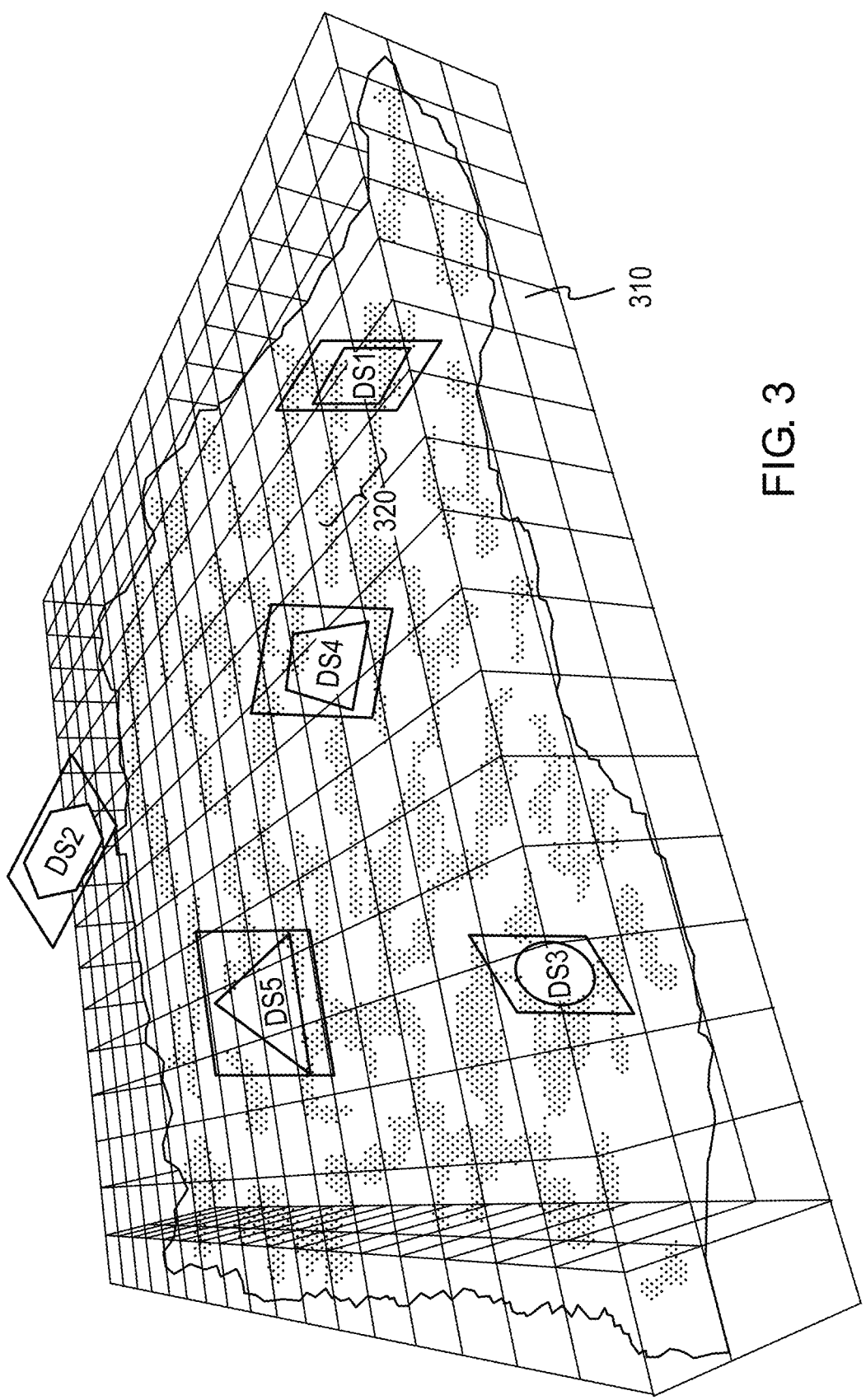
FIG. 3 illustrates a 3D virtual visualization of an operational area in accordance with an exemplary embodiment of the present disclosure.

FIG. 3 illustrates a 3D virtual visualization of an operational area in accordance with an exemplary embodiment of the present disclosure. The 3D virtual visualization of the operational area 110 generated by the computer system 120 and the one or more processors 118 of the edge devices 114 includes "3D grids" that define plural sub-regions 320 within the operational area 110 extended to a preferred ceiling height 305 above the terrestrial floor 315. For example, each of the computer system 120 and the one or more processors 118 of the edge devices 114 is configured to generate the 3D virtual visualization of the operational area by dividing a space of the operational area 110 into a plurality of 3D grid spaces 310. Each operational sub-region 320 includes one or more 3D grid spaces 310. Each 3D space 310 is bounded by ground-level altitude 325 (e.g., the height above ground level), a user-defined ceiling altitude 305 (e.g., the highest altitude at which the edge device 114 or dynamic sensors DS1-DSn can reach in the operational area 110), and the jurisdictional terrestrial boundary requiring protection/monitoring 330 (e.g., land-based geographical areas). This physical space may dynamically change if one or more of the dynamic sensors DS1-DSn detect a new activity or a change in a spatial characteristic of an operational sub-region 320 (e.g., a vehicle's presence and its on-board sensors may define a new geographic area to have relevant importance).

The computer system 120 and the one or more processors 118 of the edge devices 114 can be configured to: assign a real-time weighting value to each operational sub-region based on one or more of: an importance to a specified operation, a spatial or temporal relevance to a specified operation, time since last sensor observation, available granularity of the spatial characteristics in the data streams, observational perspectives of sensors from which the data streams are generated with respect to an operational sub-region, corresponding sensor-types, or velocities of anomalies within a current or adjacent operational sub-region. Based on the time since a last sensor observation of one or more sensors that are observing an operational sub-region, the computer system 120 and the one or more processors 118 of the edge devices 114 can be configured to increase a priority of the operational sub-region when an interval between receptions of data streams from a sensor arrangement of the operational sub-region increases. For example, as the intervals between sensor scans of the operational sub-region 310 increase, its weight increases so a dynamic sensor DSn system will be directed to observe the operational sub-region 310 in the next available opportunity.

The computer system 120 and the one or more processors 118 of the edge devices 114 can be configured to assign a priority to an operational sub-region 320 based on proximity of a sensor arrangement to a detected anomaly. For example, sensor proximity can be weighted to where one or more distant dynamic sensors among DS1-DSn may continuously observe an object, but a dynamic sensor of DS1-DSn in closer proximity may warrant additional observation of an operational sub region 320 to ensure artifacts are not overlooked. The weight of an operational sub region 320 increases over time if any dynamic sensors among DS1-DSn from different observational perspectives do not observe and transmit data streams regarding the operational sub-regions 320. This process allows the observational perspectives of an operational area or sub-region 320 to be diversified with respect to nature/lighting/weather/etc. and any man-made or natural obstructions. Observational perspective is not entirely objective, as details and analysis results can vary substantially based on perspective. According to an exemplary embodiment, compass rose-based quadrants can be assigned to one or more operational sub regions 320 and dynamic sensors DS1-DSn to define and/or establish differentiation in perspective. For example, dynamic sensors DS1-DSn from a first perspective may encounter sunlight, which can interfere with object views in a specified operational sub-region 320. Those of the dynamic sensors DS1-DSn having different observational perspectives of the same operational sub-region 320, for example from different viewpoints or viewpoints that are not impacted by the sunlight, can be instructed by the computing system 120 or another of the dynamic sensors DS1-DSn to inspect the specified operational sub-region(s) 320. According to an exemplary embodiment of the present disclosure, sensor types will be assigned to each operational sub region to optimally utilize dynamic sensors DS1-DSn to obtain diverse data streams from sensors that cover the three-dimensional operational area. For example, a dynamic sensor DSn configured as a software defined radio (SDR) may by instructed and/or controlled to continuously monitor the operational area 110 for signals at 2.4 GHz and triangulate any sensed signals. Alternatively, any dynamic sensors DS1-DSn that are configured as visual optical sensors in the operational area 110 as well as any dynamic sensors DS1-DSn that are configured as thermal cameras may need to view the operational sub-region (e.g., 3D grid) from many different angles to maintain continuous monitoring. Each sensor deployed to cover the operational area 110 is configured by the computing system 120 to have its own weighting criteria paired with respective geographic, time, range, and perspective criteria based on sensor type and data stream content.

According to an exemplary embodiment, the computer system 120 and the one or more processors 118 of the edge devices 114 can be configured to actively weight each sub region by comparing the 3D geometries of the respective sub regions to the geometries of the representative geometries of each deployed sensor and associated sensor type. For example, a sphere of a certain size may denote the receive sensitivity of a dynamic sensor DSn having an omni-directional radio frequency antenna. As another example, a pyramid may denote the real-time positioning of a security camera field of view.

According to an exemplary embodiment, the computer system 120 and the one or more processors 118 of the edge devices 114 can be configured to decrease a priority of an operational sub-region over time when data streams received from the operational sub-region 320 are acquired by two or more sensors from a common observational perspective. As the geometry of a dynamic sensor DSn overlaps a sub-region geometry, the computing system 120 and or the one or more processors of other dynamic sensors among DS1-DSn can confirm overlap to denote coverage is met. As a result of the overlap in coverage, the computing system 120 can relax the real-time weighting criteria of that sub-region. As the real-time weighting dynamically changes, the computing device 110 or processor of another dynamic sensor DSn can direct sensors with dynamic properties (e.g., pan-tilt-zoom motors) to change position and obtain additional inputs of the next highest priority sub region.

According to an exemplary embodiment, the computer system 120 and the one or more processors 118 of the edge devices 114 can be configured to: assign on a case-by-case basis: a first priority to an operational sub-region 320 determined to have a relevant observational perspective of the operational area of a security operation; a null priority to an operational sub-region 320 determined to lack a relevant observational perspective of the observational area; and a second priority lower than the first priority to an operational sub-region 310 determined to be on a fringe of the operational area and/or undetectable by a sensor. For example, if the operational sub-region 320 is critical to security operations, a high priority is assigned. If an operational sub-region 320 is outside observational areas (e.g., inside a building, below ground, or otherwise requested not to be viewed), a null priority is assigned. If the operational sub-region 320 is on or at the fringe of the operational area and unreachable by any of the dynamic sensors DS1-DSn, the operational sub-region is assigned a low to null priority relative to other operational sub-regions in the operational area.

According to another exemplary embodiment of the present disclosure, the computing system 120 can be configured to assign a priority to one or more operational sub-regions 320 or one or more dynamic sensors among DS1-DSn having an observational perspective of an operational sub-region 320 based on requirements of a specified operation, wherein at least two or more of the assigned priorities are different. For example, one of the operational sub-regions 320 where vehicles and/or troops are being assembled for an exercise or deployment may be given a higher priority than an operational sub-region 320 where buildings are being constructed.

According to an exemplary embodiment, the computer system 120 and the one or more processors 118 of the edge devices 114 can be configured to process each data stream by detecting one or more of: the presence of an anomaly in the operational area, a position of the anomaly in an operational sub-region, movement of the anomaly in an operational sub-region 320. The computing device 120 is configured to: extract portions of the spatial characteristics from each data stream and combine the extracted portions into a combined data set and identify one or more patterns in the combined data set.

According to an exemplary embodiment, the sensor arrangement can include two or more sensors having observational perspectives in each operational sub-region 320 and the system is configured to: prioritize each sensor based on characteristics including a location of the operational sub-region, time between data acquisitions, range from an anomaly in the operational sub-region 320, or an observational perspective within the operational sub-region 320.

According to yet another exemplary embodiment the sensor arrangement can include two or more sensors having observational perspectives in each operational sub-region 320 and the system is configured to: prioritize each sensor based on characteristics including a location of the operational sub-region 310, time between data acquisitions, range from an anomaly in the operational sub-region 320, or an observational perspective on the anomaly that is at that time located within the operational sub-region 320.

According to another exemplary embodiment, the sensor arrangement can include a first sensor arrangement and a second sensor arrangement, and the computing system 120 can be configured to: dynamically adjust the determined priority of the first operational sub-region, adjust one or more properties of the first sensor arrangement based on the adjusted priority, and acquire data from the second sensor arrangement in a next highest priority operational sub-region 320. The computing system 120 can be configured to adjust one or more properties of the first sensor arrangement in the first operational sub-region to eliminate observational gaps in coverage of the first operational sub-region 320, establish granular observation of the first operational sub-region 320, or perform a triangulation of an anomaly under observation in the first operational sub-region 320. The computing system 120 can be configured to: identify a first sensor of the first sensor arrangement having observational perspective of the first operational sub-region 320 that is currently engaged in a first observation activity, and identify a second sensor in the first sensor arrangement that is available to engage in a second observation activity of the first operational sub-region 320. For example, in parallel operation with sensors collecting sensor data and communicating associated data streams, the computing system 120 can be configured to perform resource scheduling of all available, potentially relevant dynamic sensors DS1-DSn (under its control) to reposition them in an effort to diminish temporal and geographic observational gaps, improve granularity of observation, or perform triangulation of a target under observation. This action can involve issuance of Internet Protocol (IP)-based communication to pan-tilt servo motors to "cue and slew" sensors to improve the real-time collection of data. This type of action may also require more extravagant control of robotic (autonomous) vehicles to inspect sub regions. As part of this resource scheduling, the computing system 120 will be aware of sensors that were previously engaged in observation activities where a dynamic sensor DSn has detected anomalistic behavior and is deemed busy or occupied in an activity. The computing system 120 will then search for other available sensors to support operational needs, where the system uses a methodology for managing sensor resources so that high target accuracy can be attained. The method considers available resources, the prioritization of operational sub-regions, and the prioritization of targets.

According to an exemplary embodiment of the present disclosure, the computer system 120 can be configured to: respond to threats by deploying resources and engaging in activities to perform predefined critical mitigation protocols such as, for example, responding to denial of service attacks, attacks that impair or stop functionality or operation of the computer system or associated devices or networks. The system 100 can be combined with the one or more subsystems, each of which includes an electronic warfare system, a directed energy system, or a kinetic weapon system. For example, beyond relaxing operational sub region 320 prioritization, computer system or edge device software may also control and automate functions of other unique systems such as Electronic Warfare technologies, Directed Energy, and kinetic weapons.

Figure 4A:
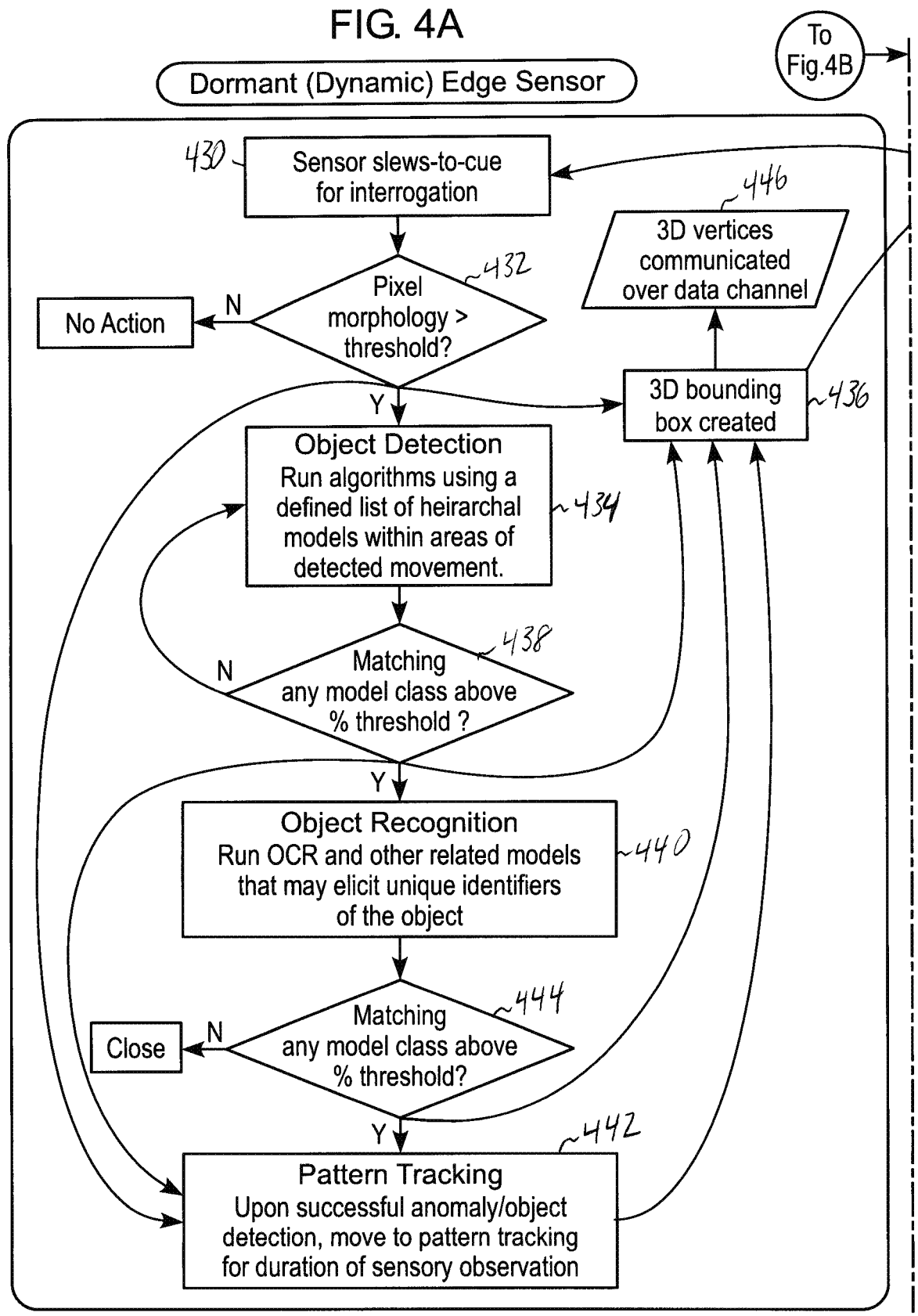
Figure 4B:
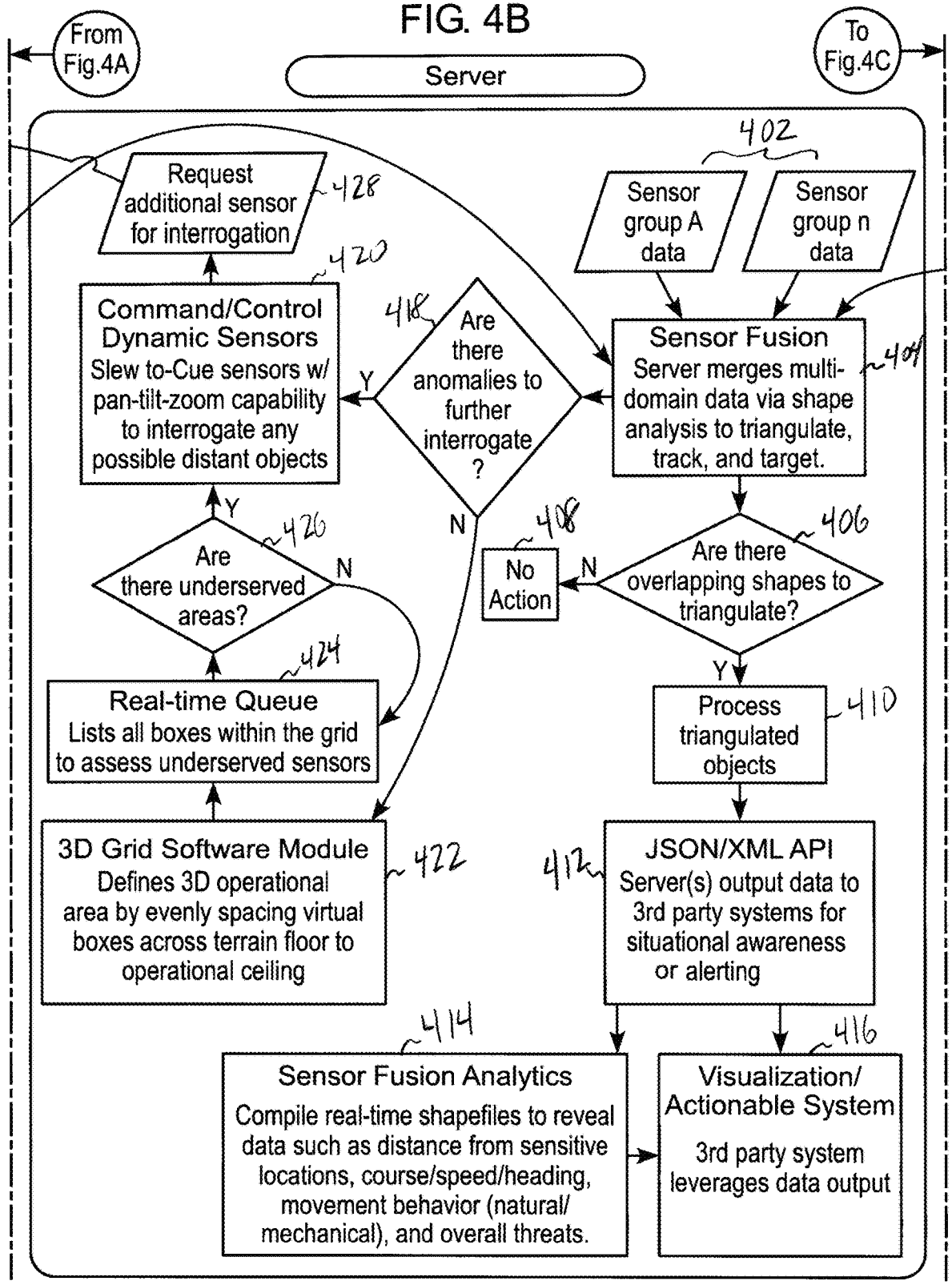

FIGS. 4A-4C illustrate a flow diagram of a method performed by the system of FIG. 1 in accordance with an exemplary embodiment of the present disclosure.

As shown in FIG. 4B, the computing system 120 receives real-time datastreams from one or more dynamic sensors (DS1-DSn) having an observational perspective of the operational area 110 (step 402). The computing system 120 is configured to merge the heterogeneous data of the different sensors (and sensor types) via an analysis of the shapes of the sensor fields to triangulate, track, and target an object in the operational area 110 (step 404). As a result of the merge, the computing system 120 determines whether there are any overlapping shapes of any dynamic sensors among DS1 to DSn to triangulate (step 406). If there are no shapes to triangulate, the processing ends (step 408). On the other hand, if there are shapes to triangulate, then the computing system 120 triangulates the shapes (step 410). Once the shapes are processed, the computing system 120 can send the processed data to the communication interface 122 so that the data can be formatted into a control and/or data signal and communicated to one or more external systems 150 for situational awareness or alerting over a network 140 (step 412). The data signal can be used to perform various operations including, among others, sensor data fusion analytics where the data signal can be encoded with real-time shapefiles which can be processed to obtain data indicating a distance of an object from sensitive locations, course/speed/heading of an object, movement behavior of an object such as natural or mechanical drive, and assessment of potential threats to an object or an operational area 330 (step 414), which can be used by an external or third party system 150 (step 416) to react to or address the threat.

Following or in parallel with the sensor data fusion operation (step 404), the computing system 120 determines whether there are any anomalies to interrogate (step 418). If there are, then the computing system 120 initiates command/control operations with one or more of the dynamic sensors DS1-DSn of the sensor arrangement (step 420). The command/control operation can involve the computing system 120 sending "cue and slew" controls to any of the dynamic sensors with, for example, pan-tilt-zoom features, so that the operational area 330 or operational sub-regions 320 can be interrogated to detect distant objects. If distant objects are not detected, then the computing system 120 can define a 3D operational area by evenly spacing virtual boxes across a terrain flow to an operational ceiling 305 (step 422). The computing system 120 establishes a real-time queue in which all operational sub-regions within the operational area grid are listed to identify underserved operational sub-regions (step 424). If any underserved sub-regions are identified (step 426), then the computing system 120 initiates command/control operations as discussed above (step 420). In order to undertake the command/control operations, the computing system 120 generates data/control signals to request additional sensor data from one or more sensors DS1-DSn in the sensor arrangement (step 428). If there are no underserved sub-regions, the computing system 120 moves to the next box in the queue to determine if the corresponding sub-region is an underserved sub-region (step 424). Steps 424 and 426 are repeated until all boxes in the list are processed.

As shown in FIG. 4A, computing system 120 can send to a dormant edge sensor DSn of the sensor arrangement a request for additional sensor data, including "cue and slew" commands to orient the sensor in a desired direction for monitoring an operational sub-region to detect an object or activity (step 430). The processor of the dynamic sensor DSn determines whether a pixel morphology (e.g., comparison of each individual pixel values with neighboring pixel values) is greater than a threshold (step 432). If the morphology exceeds the threshold, then the processor performs object detection within areas of detected movement by executing one or more algorithms from a defined list of hierarchical models (step 434). In addition, a 3D bounding box is created around the area of pixel morphology (e.g., around the object) (step 436). If an object matching any model class above a % threshold is detected (step 438), then another (e.g., second) 3D bounding box is created for the object (436), object recognition is performed to identify unique identifiers of the object (step 440), and pattern tracking is performed on the object for a duration of sensory observation (step 442). Following object recognition at step 440, it is determined whether the detected object matches any class above a percent threshold (444). If the object does match such a class, then the pattern tracking of step 442 is performed and another (e.g., third) 3D bounding box is generated (step 436). Following the pattern tracking (step 442), another (e.g., fourth) bounding box is created (step 436). Once the bounding box(es) is/are created, the dynamic sensor DSn communicates 3D vertices to the computing system 120 over the network (step 446). As shown in FIG. 4B, the computing system 120 receives the 3D vertices and performs sensor data fusion (step 404).

FIG. 4C also shows a process in which a dynamic sensor DSn can be activated upon detection of an anomaly. The process is activated when an anomaly enters the operational area 330, or operational sub-region 320 for which the sensor has observational perspective (Step 448). One or more of the dynamic sensors DS1-DSn that have an observational perspective of the operational area 330 detect the anomaly (step 450). Pixel morphology is performed on the detected anomaly and it is determined whether the morphology result is above a threshold (step 452). If the morphology result is above the threshold, a 3D bounding box is generated (step 454), object identification is performed using to analyze the images within areas of detected movement (step 456), and pattern tracking is performed for the duration of the tracking of the anomaly (step 458). The one or more algorithms used for object identification are defined by one or more hierarchical models selected from a defined list stored in memory or accessible over the network. If the result of the morphology determination is below the threshold, then anomaly detection is repeated (step 452). Following object detection (step 456), the dynamic sensor DSn determines whether any detected object morphology matches any model class by meeting or exceeding a predetermined percent threshold (step 460). If a threshold is met or exceeded, object recognition is performed to identify any unique identifiers of the object (step 462) and another (e.g., second) 3D bounding box is generated. If the detected object does not meet the model class threshold, then the object detection operation is repeated (step 456). Following the object recognition operation (step 462), the processor of the dynamic sensor DSn determines whether the object matches any model class by meeting or exceeding a predetermined percent threshold (step 464). If the predetermined percent threshold is met or exceeded, pattern tracking is performed (step 458) and another (e.g., third) 3D bounding box is generated (step 454). Following pattern tracking, the processor generates another (e.g., fourth) 3D bounding box. After the 3D bounding box(es) is/are created, the dynamic sensor DSn communicates 3D vertices to the computing system 120 over the network (step 460).

The computer program code for performing the specialized functions described herein can be stored on a medium and computer usable medium, which may refer to memories, such as the memory devices for both the computing system 120 and edge devices 114, which can be memory semiconductors (e.g., DRAMs, etc.). These computer program products can be a tangible non-transitory means for providing software to the computing system 100. The computer programs (e.g., computer control logic) or software can be stored in the memory device. The computer programs can also be received via the communications interface. Such computer programs, when executed, can enable the computing system 120 and edge device 114 to implement the present methods and exemplary embodiments discussed herein. Accordingly, such computer programs may represent controllers of the computing system 120 and edge devices 114. Where the present disclosure is implemented using software, the software can be stored in a non-transitory computer readable medium and loaded into the computing system 100 using a removable storage drive, an interface, a hard disk drive, or communications interface, etc., where applicable.

The one or more processors of the computing system 120 and the edge devices 114 can include one or more modules or engines configured to perform the functions of the exemplary embodiments described herein. Each of the modules or engines can be implemented using hardware and, in some instances, can also utilize software, such as program code and/or programs stored in memory. In such instances, program code may be compiled by the respective processors (e.g., by a compiling module or engine) prior to execution. For example, the program code can be source code written in a programming language that is translated into a lower level language, such as assembly language or machine code, for execution by the one or more processors and/or any additional hardware components. The process of compiling can include the use of lexical analysis, preprocessing, parsing, semantic analysis, syntax-directed translation, code generation, code optimization, and any other techniques that may be suitable for translation of program code into a lower level language suitable for controlling the computer system 120 or edge device 114 to perform the functions disclosed herein. It will be apparent to persons having skill in the relevant art that such processes result in the computer system 120 and/or edge device 114 being specially configured computing devices uniquely programmed to perform the functions discussed above.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning, range, and equivalence thereof are intended to be embraced therein.

What is claimed is:

1. A system for monitoring an operational area, the system comprising:
a sensor arrangement including two or more sensors, wherein:
each sensor includes a processor configured to receive plural data streams from the sensor arrangement, each data stream including a different spatial characteristic of the operational area; and
each sensor is configured to:
generate a three-dimensional (3D) virtual visualization of the operational area based on observational perspectives associated with the data streams and their associated spatial characteristics;
dynamically prioritize operational sub-regions within the operational area based on the spatial characteristics; and
generate a signal encoded with data for verifying the 3D virtual visualization of the operational area including the prioritized operational sub-regions.

2. The system according to claim 1, further comprising:
an interface that receives the signal from the processor and generates an output verifying the 3D virtual visualization of the operational area.

3. The system according to claim 1, wherein
the two or more sensors are configured to move between two or more locations of observational perspective with respect to the operational area.

4. The system according to claim 1, wherein the two or more sensors include any combination of one or more sensor types.

5. The system according to claim 4, wherein each sensor comprises:
at least one of an acoustic, radio frequency, electro-optical, thermal, chemical, biological, radiological, nuclear, explosive, temperature, or mechanical sensing capability.

6. The system according to claim 5, further comprising:
a communication interface for communicating with a network, and wherein each sensor is configured to: transmit a data stream periodically or non-periodically to the processor over the network.

7. The system according to claim 6, wherein each sensor is configured to:
transmit data to the processor when a change in a spatial characteristic of an operational sub-region is detected.

8. The system according to claim 1, comprising:
a memory device for storing the plural data streams.

9. The system according to claim 1, wherein each sensor is configured to: generate the 3D virtual visualization of the operational area by dividing the operational area into a plurality of 3D grid spaces.

10. The system according to claim 9, wherein each operational sub-region includes one or more 3D grid spaces.

11. The system according to claim 10, wherein each sensor is configured to: generate the plural data streams by observing the operational area, wherein a 3D geometry of each operational sub-region is determined based on one or more sensing characteristics of the sensor arrangement.

12. The system according to claim 11, wherein the 3D geometry of each operational sub-region is dimensioned according to spatial properties of the operational area.

13. The system according to claim 11, wherein each sensor is configured to: dynamically change the 3D geometry of one or more operational sub-regions based on a detected change in a spatial characteristic of the one or more operational sub-regions, the change in the spatial characteristic is determined from the plural data streams.

14. The system according to claim 10, wherein each sensor is configured to: assign a real-time prioritization value to each operational sub-region based on one or more of: an operational importance to a specified operation, a spatial or temporal relevance to a specified operation activity, the period since last sensor observation, available granularity of the spatial characteristics in the data streams, an observational perspective of an operational sub-region for which the data streams are generated, a sensor type, or velocity of an anomaly within an operational sub-region of interest or a sub-region adjacent to the sub-region.

15. The system according to claim 14, wherein each sensor is configured to assign on a case-by-case basis:
a first priority to an operational sub-region determined to be included in a security operation;
a null priority to a sub-region determined to be outside of a specified operational area; and
a second priority to an operational sub-region determined to be on a fringe of the operational area and/or undetectable by a sensor, the second priority being lower than the first priority.

16. The system according to claim 14, wherein each sensor is configured to assign a priority to one or more operational sub-regions, or one or more sensors with observational perspective of an operational sub-region, based on requirements of a specified operation, wherein at least two or more of the assigned priorities are different.

17. The system according to claim 1, wherein each sensor is configured to process each data stream by detecting one or more of: a position of an anomaly in an operational sub-region or movement of an anomaly in an operational sub-region.

18. The system according to claim 17, wherein each sensor is configured to: extract portions of the spatial characteristics from each data stream and combine the extracted portions into a combined data set, and identify one or more patterns in the combined data set.

19. The system according to claim 1, wherein each sensor is configured to: increase a priority of an operational sub-region when an interval increases between receptions of data streams from a sensor arrangement having observational perspective, if the duration of the interval exceeds a threshold.

20. The system according to claim 1, configured to: assign a priority to an operational sub-region based on the sensor arrangement's observational perspective of the sub-region, and the sensor arrangement's proximity to a detected anomaly.

21. The system according to claim 1, wherein each sensor is configured to: increase a priority of an operational sub-region over time when data streams received from the operational sub-region are acquired by two or more sensor arrangements having a common observational perspective.

22. The system according to claim 1, wherein each sensor has observational perspective of each operational sub-region and the system is configured to: prioritize each sensor based on characteristics including a location of the operational sub-region, the interval between data streams from the operational sub-regions, the location of an anomaly in or near the operational sub-region, or an observational perspective of the operational sub-region.

23. The system according to claim 1, wherein the sensor arrangement comprises: a first sensor arrangement and a second sensor arrangement, and the system is configured to: dynamically adjust the priority of a first operational sub-region, adjust one or more properties of the first sensor arrangement based on the adjusted priority, and acquire data from the second sensor arrangement in a next highest priority operational sub-region.

24. The system according to claim 23, further comprising:
a computing system configured to: adjust one or more properties of the first sensor arrangement that has observational perspective of the first operational sub-region, to eliminate gaps in the sensor arrangement's observational perspective of the first operational sub-region, establish granular observation of the first operational sub-region, or perform a triangulation of an anomaly under observation in the first operational sub-region.

25. The system according to claim 23, further comprising:
a computing system configured to: identify a first sensor of the first sensor arrangement in the first operational sub-region that is currently engaged in a first observation activity, and identify a second sensor in the first sensor arrangement that is available to engage in a second observation activity in the first operational sub-region.

26. The system according to claim 1, further comprising:
a computing system configured to: control one or more sub-systems for performing predefined critical tasks to respond to or mitigate threats such as denial of service attacks or impairing or halting electronic functionality of the system or devices associated with the system.

27. The system according to claim 26, in combination with the one or more subsystems, each of which includes an electronic warfare system, a directed energy system, or a kinetic weapon system.

28. A method for monitoring an operational area, the method comprising:
in one or more devices connected in a network:
receiving one or more data streams from a sensor arrangement that includes two or more sensors, each data stream including a different spatial characteristic of the operational area; and
in at least one of the two or more sensors of the sensor arrangement:
generating a 3D virtual visualization of the operational area based on an observational perspective associated with each data stream and the different spatial characteristics included in each data stream;
dynamically prioritizing operational sub-regions within the operational area based on the received spatial characteristics; and
generating a signal for verifying the 3D visual virtualization of the operational area including the prioritized operational sub-regions.

29. The method according to claim 28, comprising:
in an interface of the one or more devices or an interface connected to the network:
receiving the signal for verifying the 3D virtual visualization of the operational area; and generating an output that verifies the 3D virtual visualization of the operational area.

30. The method according to claim 28, wherein generating the 3D virtual visualization of the operational area comprises:
defining one or more 3D grid spaces within the operational area.

31. The method according to claim 28, wherein each operational sub-region includes one or more 3D grid spaces, the method comprising:
defining a 3D geometry of each operational sub-region based on the observational perspective of each data stream and the spatial characteristics included in each data stream; and
dynamically changing the 3D geometry of one or more operational sub-regions based on a detected change in a spatial characteristic of the one or more operational sub-regions.

32. The method according to claim 31, comprising:
assigning a real-time priority to each operational sub-region based on one or more of: operational importance to a specified operation, spatial or temporal relevance to a specified operation activity, the duration of the interval since last sensor observation, available granularity of sensing, the observational perspective of the sensor arrangement within an operational sub-region, the sensor-type, or velocity of an anomaly within an operational sub-region or an adjacent operational sub-region.

33. The method according to claim 32, wherein assigning a real-time priority to each operational sub-region, on a case-by-case basis, comprises:
assigning a first priority to an operational sub-region that will be included in security operations;
assigning a null priority to an operational sub-region determined to be outside of a specified operational area; or
assigning a second priority lower than the first priority to an operational sub-region determined to be on a fringe of the operational area and/or undetectable by a sensor of the two or more sensors.

34. The method according to claim 32, comprising:
assigning a priority to one or more operational sub-regions or one or more sensors having observational perspective of an operational sub-region based on characteristics of a specified operational activity, wherein two or more of the assigned priorities are different.

35. The method according to claim 34, comprising:
identifying a first sensor in the sensor arrangement having observational perspective of the first operational sub-region that is currently engaged in a first observation activity, and identifying a second sensor in the sensor arrangement that is available to engage in a second observation activity in the first operational sub-region,
wherein identifying the second sensor in the first operational sub-region is based on one or more of an availability of resources, a prioritization of operational sub-regions, or a prioritization of anomalies.

36. The method according to claim 34, comprising:
dynamically adjusting the priority of the first operational sub-region, and
dynamically adjusting one or more properties of a first sensor arrangement in the first operational sub-region based on the adjusted priority and acquiring spatial characteristics of the first operational sub-region from a second data stream received from a second sensor arrangement in a next highest priority operational sub-region.

37. The method according to claim 36, comprising at least one of:
adjusting one or more properties of the sensor arrangement having observational perspective on the first operational sub-region to eliminate gaps in observational perspective in coverage of the 3D geometry of the first operational sub-region;
establishing granular observation of the first operational sub-region; or
performing a triangulation of an anomaly under observation in the first operational sub-region.

38. The method according to claim 28, comprising:
analyzing the data streams from a sensor arrangement having observational perspective of a first operational sub-region to detect a position of an anomaly in the first operational sub-region, and/or movement of an anomaly in the first operational sub-region.

39. The method according to claim 38, comprising:
extracting portions of the spatial characteristics from the data streams of the first operational sub-region;
combining the extracted portions into a combined data set; and
identifying one or more patterns in the combined data set.

40. A non-transitory computer readable medium encoded with a program for performing a method of monitoring an operational area, which when placed in communicative contact with a processor configures the processor to:
generate a three-dimensional (3D) virtual visualization of the operational area based on an observational perspective of plural data streams from a sensor arrangement and different spatial characteristics included in each data stream,
wherein the sensor arrangement includes two or more sensors, each sensor configured to:
dynamically prioritize operational sub-regions within the operational area based on the spatial characteristics; and
generate a signal for verifying the 3D virtual visualization of the operational area including the prioritized operational sub-regions.

41. A system for monitoring an operational area, the system comprising:
a sensor arrangement including two or more sensors, each sensor including a processor configured to receive a plurality of data streams from the other sensors in the sensor arrangement, each data stream including a different spatial characteristic of the operational area, each sensor configured to:
generate a three-dimensional (3D) virtual visualization of the operational area based on observational perspectives associated with the data streams and their associated spatial characteristics;
dynamically prioritize operational sub-regions within the operational area based on the spatial characteristics;
increase a priority of one of the operational sub-regions when an interval between reception of the data streams from the sensor arrangement increases beyond a threshold; and
generate a signal encoded with data for verifying the 3D virtual visualization of the operational area including the prioritized operational sub-regions.

42. A system for monitoring an operational area, the system comprising:

a sensor arrangement including two or more sensors, each sensor including a processor configured to receive a plurality of data streams from the other sensors in the sensor arrangement, each data stream including a different spatial characteristic of the operational area, each sensor configured to:
 generate a three-dimensional (3D) virtual visualization of the operational area based on observational perspectives associated with the data streams and their associated spatial characteristics;
 dynamically prioritize operational sub-regions within the operational area based on the spatial characteristics;
 assign a priority to one of the operational sub-regions based on the observational perspective of the sensors in the sensor arrangement, proximity of the sensors in the sensor arrangement to a detected anomaly; and
 generate a signal encoded with data for verifying the 3D virtual visualization of the operational area including the prioritized operational sub-regions.

43. A system for monitoring an operational area, the system comprising:
 a sensor arrangement including two or more sensors, each sensor including a processor configured to receive a plurality of data streams from the other sensors in the sensor arrangement, each data stream including a different spatial characteristic of the operational area, each sensor configured to:
 generate a three-dimensional (3D) virtual visualization of the operational area based on observational perspectives associated with the data streams and their associated spatial characteristics;
 dynamically prioritize operational sub-regions within the operational area based on the spatial characteristics;
 increase a priority of one of the operational sub-regions over time when data streams received from the operational sub-region are acquired by multiple sensor arrangements having a common observational perspective; and
 generate a signal encoded with data for verifying the 3D virtual visualization of the operational area including the prioritized operational sub-regions.

* * * * *